United States Patent
Young

(10) Patent No.: US 7,474,261 B2
(45) Date of Patent: Jan. 6, 2009

(54) RADIOLOCALIZATION RECEIVER AND SIGNAL PROCESSOR

(75) Inventor: Phil Young, Grange Park (GB)

(73) Assignee: NemeriX SA, Manno (CH)

( * ) Notice: Subject to any disclaimer, the term of this patent is extended or adjusted under 35 U.S.C. 154(b) by 0 days.

(21) Appl. No.: 11/584,469

(22) Filed: Oct. 20, 2006

(65) Prior Publication Data
US 2007/0090994 A1 Apr. 26, 2007

(30) Foreign Application Priority Data
Oct. 21, 2005 (EP) .................. 05109854

(51) Int. Cl.
*G01S 1/00* (2006.01)
(52) U.S. Cl. .............. 342/357.12; 342/357.06
(58) Field of Classification Search ........... 342/357.02, 342/357.06, 357.12, 357.15, 358; 701/213, 701/215
See application file for complete search history.

(56) References Cited

U.S. PATENT DOCUMENTS

| 5,331,329 | A | * | 7/1994 | Volkov et al. .......... 342/357.01 |
| 5,592,173 | A | | 1/1997 | Lau et al. |
| 5,594,453 | A | | 1/1997 | Rodal et al. |
| 5,663,734 | A | | 9/1997 | Krasner |
| 6,212,398 | B1 | | 4/2001 | Roberts et al. |
| 6,519,237 | B1 | * | 2/2003 | McDonough et al. ....... 370/335 |
| 6,937,187 | B2 | | 8/2005 | van Diggelen et al. |
| 6,937,643 | B2 | * | 8/2005 | Li et al. ...................... 375/147 |
| 7,102,689 | B2 | * | 9/2006 | Grossman et al. ........... 348/465 |
| 2003/0112179 | A1 | | 6/2003 | Gronemeyer |
| 2005/0013350 | A1 | * | 1/2005 | Coralli et al. ............... 375/148 |
| 2005/0212699 | A1 | | 9/2005 | Horslund et al. |
| 2006/0245480 | A1 | * | 11/2006 | Medlock et al. ............. 375/150 |

\* cited by examiner

*Primary Examiner*—Dao L Phan
(74) *Attorney, Agent, or Firm*—Pearne & Gordon LLP

(57) ABSTRACT

Pseudo-range processor (20) for a satellite radiolocalization receiver (100) having access to an auxiliary clock (38) used to clock an auxiliary reference timer (40). The auxiliary reference timer (40) is periodically sampled (170) during tracking, in relation to the GPS time kept by the main clock. The processor allows intermittent operations, between periods in a low-power sleep mode during which correlators (25) and main clock (37) are inactive. On wake-up a new sample is taken of the auxiliary reference timer (40), which allows an estimation of the most likely position of the correlation peaks (123*a-c*). The correlation engine can therefore directly start to search for peaks in appropriate code phase windows, with a high probability of immediate reacquisition.

26 Claims, 3 Drawing Sheets

RADIOLOCALIZATION RECEIVER AND SIGNAL PROCESSOR

REFERENCE DATA

The present application claims priority from European Patent application EP05109854 filed on Oct. 21, 2005, the contents whereof are hereby incorporated by reference.

FIELD OF THE INVENTION

The current invention relates to satellite radiolocalization devices, for example devices for determining exact time and geographic location by the signals received from a constellation of satellites. More in particular the present invention relates to a satellite radiolocalization device in which the power consumption can be reduced by switching off selected sub-systems of the receiver.

DESCRIPTION OF RELATED DATA

Satellite radiolocalization systems, such as GPS (Global Positioning System), GLONASS or Galileo rely on the reception of radio signals broadcast from a number of orbiting satellites and use the information contained in these signals to determine the distances, or ranges, from the receiver to each of the received satellites. The orbits of the satellites being known, absolute time and the location of the GPS receiver can then be determined geometrically.

In the context of the present invention the terms "receiver" and "GPS receiver" can designate a complete self-contained receiver device, but also a module, included in a complex entity, for example a GPS module in a cellular phone, a car alarm, a PDA (Portable Digital Assistant) and so forth. The terms above may also indicate a pluggable module, which may be connected with a hosting device by means of an appropriate bus, for example a GPS PC-card.

The terms "receiver" and "GPS receiver" should also be understood, in the context of the present invention, as including one or more integrated circuits, arranged to realize a complete GPS receiver or a complete GPS module, as defined above.

The following description relates mostly to the GPS Global Positioning System. The invention is not however limited to this particular system but can also be employed in receivers for radiolocalization systems based on the same principles, for example the GLONASS system or the GALILEO system.

The general functioning of a satellite radiolocalization devices are well known and will be resumed briefly in the description. Reference is made to patent applications EP 1198068 and WO05003807 in the name of the applicant, which are hereby incorporated by reference.

In the case of GPS radiolocalization system, each of the operational GPS satellites transmits a microwave radio signal composed of two carrier frequencies, referenced as "L1" and "L2" frequencies and situated at 1572.42 MHz and 1227.60 MHz respectively. The L1 and L2 carriers are modulated by two digital ranging code sequences, called the C/A code and the P code. Presently the C/A code, which is used by commercial GPS receiver, is modulated in the L1 and in the L2 frequency, while the P code, whose usage is mostly restricted to the US government and military. The C/A codes, which are unique for each GPS satellite, are pseudo-random Gold codes comprising a repetition of a 1023 bits, or "chips", with a transition rate of 1.023 MHz. The C/A code thus repeats itself every millisecond. The ranging code sequences are synchronized to a common precise time reference, the "GPS time" which is held by precise clocks on board of each satellite, and which are synchronized to a master clock.

Other radiolocalization systems, for example the proposed Galileo system, also employ similar or equivalent signal structures, based on ranging codes synchronized to a common standard of absolute time. The term "GPS time" is used in the following to designate both the absolute time standard of the GPS system and the time standard of other radiolocalization satellite systems, when the invention is applied to such systems.

Both L1 and L2 carriers are also modulated by a 50 bps navigation message, the NAV code. The navigation message contains, along with other information, the coordinates of the GPS satellites as a function of time, clock corrections, and atmospheric data.

In order to acquire these codes and perform a position fix a GPS receiver generates, for each received satellite, a local replica of the C/A code, adjusted to a local NCO running at a frequency close to 1.023 MHz, taking into account the Doppler shift of the received satellite. The code is then time-shifted and correlated with the received signal in a correlation engine of the receiver, until a peak of correlation value is obtained, indicating that the local code is synchronized with the code of the satellite. The amount of time-shift needed to achieve optimal correlation, or pseudo-range, is an indication of the distance between the satellite and the GPS receiver. The internal clock of the GPS is usually affected by a large error with respect to the GPS satellite clocks. In order to resolve this error a GPS receiver must acquire at least four satellites to provide a position fix comprising the three space coordinates x, y, z and time t.

The carrier frequencies of GPS signals are, in addition, shifted from the nominal frequency by an unknown Doppler shift. The acquisition of GPS signals is an inherently time consuming process which involves searching for a correlation peak in a three-dimensional parameter space, whose axes correspond to the satellite identity; frequency and temporal shift of the pseudo-random Gold code. For each search, aimed at a specific satellite, all possible code phases plus all possible frequencies may have to be tried in the correlation circuit until a peak is found. The search process is particularly long when no prior knowledge is available and can extend to several seconds in the worst case. Once the peak is found, in the tracking phase, the system has only to follow its drift, which is usually done with less difficulty or delay.

This long acquisition time is a limiting factor in many applications of GPS. In particular in certain low-rate, low power applications, like for example location services in portable telecommunication networks and the like, where it would be desirable to supply the GPS receiver only for short periods of time.

In particular most applications only request a moderate rate of position fixes. In a car navigation system rates from one fix per second to one fix every five seconds are considered standard. In lower-speed applications, for example in pedestrian tracking, the fixes can be spaced even further in time, for example once per minute. It would be therefore possible to further reduce the power consumption of the receiver by switching off selected part of the receiver in the interval between fixes. In order to work in intermittent mode the receiver should, however, be able to re-acquire immediately those satellites which had been tracked in the precedent fix, without performing a full search for the correlation peak each time. For this reason some elements of the receiver, for example the main clock and the correlation engine, are not switched off in intermittent mode.

It is an aim of the present invention to provide a receiver for a radiolocalization system which overcomes the above limitation and, furthermore is an aim of the present invention to provide a receiver for a radiolocalization system which exhibits low power consumption by switching off selected components in an intermittent fashion.

BRIEF SUMMARY OF THE INVENTION

According to the invention, these aims are achieved by means of a signal processor for processing the signal in a satellite radiolocalization receiver having the capacity of direct reacquisition of the satellite signals after an interruption of the main clock signal, as claimed in independent claim 1.

The invention further comprises a complete satellite radiolocalization receiver comprising such a signal processor, either as standalone unit or as modular unit to be interfaced to a host system, like a PDA or a cellphone.

Furthermore the present invention encompasses a method for the reacquisition of satellite signals in a satellite radiolocalization receiver after an interruption of a main clock signal having the features claimed in the corresponding independent method claim, and a computer program for carrying out the same method.

BRIEF DESCRIPTION OF THE DRAWINGS

The invention will be better understood by with the aid of the description of an embodiment given by way of example and illustrated by the figures, in which.

DETAILED DESCRIPTION OF POSSIBLE EMBODIMENTS OF THE INVENTION

Figure 1:
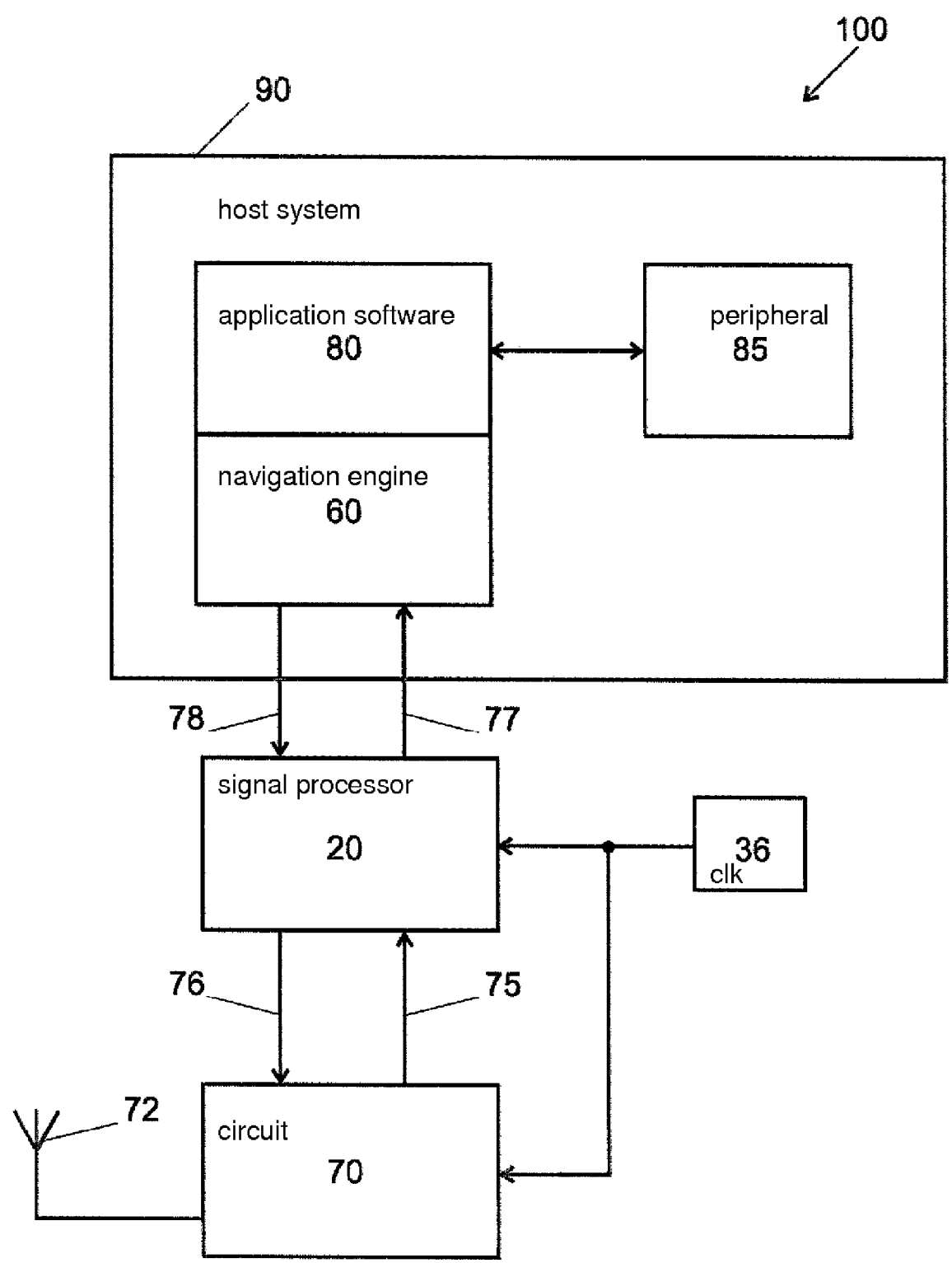
FIG. 1 shows, in a simplified schematic way, the structure of a satellite radiolocalization device.

According to FIG. 1, the radiolocalization device 100 of the present invention comprises a radiofrequency module 70, whose function, which will not be discussed in detail here, is to process the signals received from the radiolocalization satellites by the antenna 71. The radiofrequency circuit comprises a simple- or multiple-conversion heterodyne radio receiver and provides at his output 75 an intermediate frequency signal, for example a low-IF signal at 4.092 MHz or, alternatively, a digital baseband signal.

According to the modulation scheme of the received satellite constellation, the output 75 will comprise several angular component of the signal. In the case of GPS, for example, two components shifted by 90° are needed, and are conventionally referred to as the I (In-phase) and Q (Quadrature) component. Other modulation schemes, for example the modulation proposed for the GALILEO system, call for more than two angular components.

The RF module 70 is connected to a main timebase generator 36, which provides a stable timebase reference for the radiolocalization device 100, for example a 32.734 MHz timebase. Since timebase generator 36 must be relatively precise and stable to allow acquisition and tracking of the GPS signal, it comprises generally a high-quality temperature compensated crystal oscillator or TCXO.

The output 75 of the RF module 70 is fed to a signal processor 20, also called pseudo-range engine 20 which, in turn, provides control instructions 76 to the RF circuit 70. The function of the pseudo-range engine 20 is to de-spread the signals received from the satellites, by generating, for each received satellite, a local replica of the modulation code (the C/A code in the case of a commercial GPS receiver) which is precisely time-aligned with the received signal. The code shifts, or pseudo-ranges 77, generated by the pseudo-range engine 20 are transmitted to the navigation engine 60, which calculates a fix for position and time coordinates x, y, z, t. The navigation engine also steers the pseudo-range engine 20 by appropriate search instructions 78. The positional fix is usually obtained by iterative Kalman filters, and the navigation engine may need to follow the pseudo-range data 77 along several code periods until a satisfactory solution is found.

Preferably the pseudo-range engine 20 and the RF module 70 are realized as two separate integrated circuits or as a single common integrated circuit.

In a preferred variant of the invention the navigation engine 60 is part of a host system 90, which also comprises application navigation software 80 and appropriate peripherals 85 for interaction with a user. The radiolocalization device 100 of the invention is, in this case, an extension of the host system, for example in the form of an extension card or module for a cellular phone, a PDA, a game console, a personal computer or any other suitable host device. The invention comprises however also standalone apparatuses which incorporate navigation engine, application software and peripherals together with the RF module and pseudo-range engine.

Figure 2:
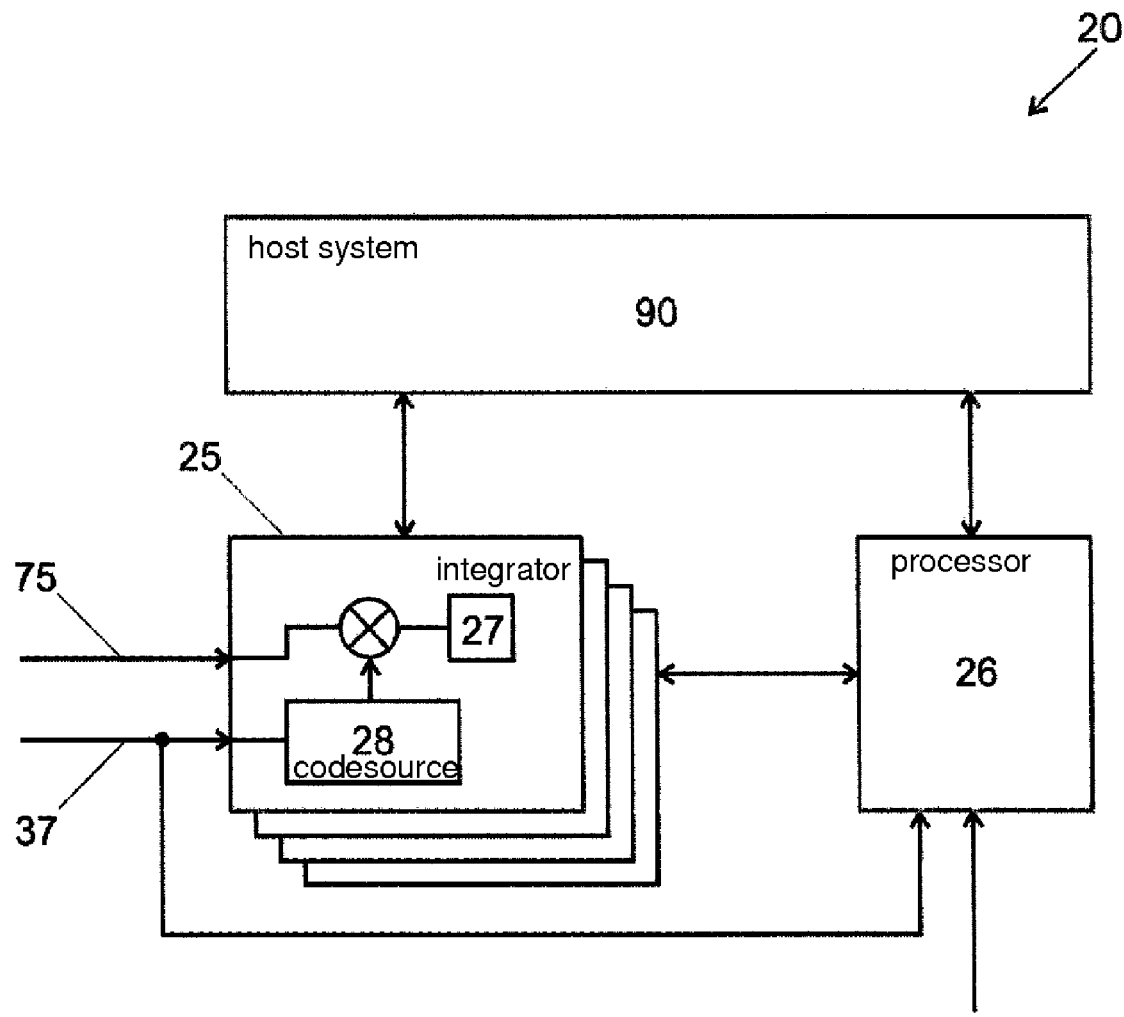
FIG. 2 represents schematically the structure of a pseudo-range engine of a radiolocalization device according to the invention.

A pseudo-range engine 20 according to the invention is now described more closely, with reference to FIG. 2. The pseudo-range engine 20 comprises a correlation engine comprising an array of correlators 25 receiving the IF or baseband signal 75 from the RF circuit 70 and a digital processor 26, for example a DSP processor. A memory 90, whose organization is not specified here, is used for recording data and instructions.

According to an aspect of the invention each correlator 25 comprises a local carrier generator, and a frequency conversion stage, not represented, for further converting the IF signal and generating a two-component baseband signal.

Each correlator comprises also at least one local Gold pseudorandom code source 28, for providing a local replica of the C/A-code corresponding to a particular GPS satellite. The code source 28 can generate internally Gold pseudorandom codes, for example by a tapped shift register, or, equivalently, fetch them from a preloaded table or by any other technique. According to a variant of the invention, the pseudorandom code source generates a code which is derived from the C/A code corresponding to a particular GPS satellite, for example a Fourier transform of a C/A code.

The code source 28 comprises an independent numerically controlled C/A clock at about 1.023 MHz connected to the timebase signal 37. The exact frequencies of the local carrier and of the local C/A code are adjusted, by the processor 26 or under instruction of the navigation engine 60, to compensate for Doppler shift on the satellite signal and local oscillator drift and bias. The incoming IF signal is multiplied by the in-phase (I) and quadrature (Q) components of the local carrier and by two time-shifted versions of the replica C/A code. The result of these operations is integrated for a programmable period of time, in the integrator 27 to generate an integrated correlation value, which is accessible to the processor 26 and to the navigation engine 60.

In a possible variant of the invention, in addition to the prompt correlation value, the correlators 25 can also be programmed to generate, for each acquired satellite, late correlation values and early correlation values, which are obtained, for example, by multiplying the GPS signal with a ½ chip delayed and a ½ chip advanced version of the local replica code. These late and early correlation values are employed to determine the shape of the correlation peak and, in the tracking algorithm, to follow the position of the correlation peak.

According to another variant the code sources 28 have multiple taps, with fixed or programmable spacing, and the correlators are therefore able to deal in parallel with a significant correlation range in code phase, for example a range of ±15 code chips, which corresponds to a time span of ±15 microseconds. Preferably, the width and granularity of the correlation windows are programmable, so that the system can provide correlation profiles of arbitrary length and having a step of 1 chip, ½ chip, ¼ chip, and so on, according to the needs.

The description of the pseudo-range engine above refers to a classical architecture with correlators. This is not, however, the only possible approach, and the present invention can also be applied to other type of GPS receiver, for example to a GPS receiver based on a FFT approach. In this case the position and shape of the correlation peaks are determined by processing a FFT transformation of the received signal. The correlation with the Gold pseudo-random codes is carried out either in the time domain, as above, or in the frequency domain. In the latter case the code source 28 may be arranged to directly provide a Fourier transform of the Gould code sequence for a particular satellite.

In possible variants of the invention the two approaches described above, the correlators-based architecture and the FFT-based architecture could be combined. For example a first acquisition could be carried out with a correlators-based acquisition engine, for those satellites which exhibit a strong signal and can be readily acquired, then a further acquisition of weaker signals could be done by a FFT-based processing system.

In another possible variant of the invention, the acquisition of the satellites could be done by a FFT-based processing system. Once a sufficient number of satellites has been identified, and the phase position of the relative correlation peaks is known, however, the tracking of these satellites is continued in a bank of correlators in the time domain, in order to save energy and computing resources.

In addition to the main time base signal 37, the pseudo-range engine 20 has also access to an auxiliary time reference 38. In a preferred variant of the invention, the auxiliary time reference 38 is obtained by a low-power real-time clock internal to the pseudo-range engine. The real-time clock comprises a low-power oscillator, for example a 32 KHz oscillator, and a time register which counts the oscillations of the low-power oscillator. The auxiliary time reference need not have high precision or stability.

Preferably the auxiliary time reference 38 is made in a manner as to draw negligible current, and can be kept running all the time while other parts of the radiolocalization device of the invention are switched off or put into low-power mode. The auxiliary time reference signal is accumulated in the auxiliary reference timer 40 which can be active and counting even if the main GPS clock is switched off. It may be possible, however to switch on the auxiliary time reference only when it is needed, for example shortly before and interruption of the main clock.

In another variant of the invention the auxiliary time reference may be external to the pseudo-range engine 20 and may be a standalone module, or an element of the RF circuit 70, or of the host system 90. In other possible variants, the auxiliary time reference may rely on an external time signal, or on an external frequency reference, continuously available to the radiolocalization device. For example, the auxiliary time reference may be a clock signal of the host system 90, for example a PC clock; if the GPS device is part of a cellular portable phone, the auxiliary time reference may be derived from a frame synchronization signal of the cell phone network.

The purpose and use of the auxiliary time reference of the invention will now be described with reference to FIGS. 3a to 3e.

Figure 3A:
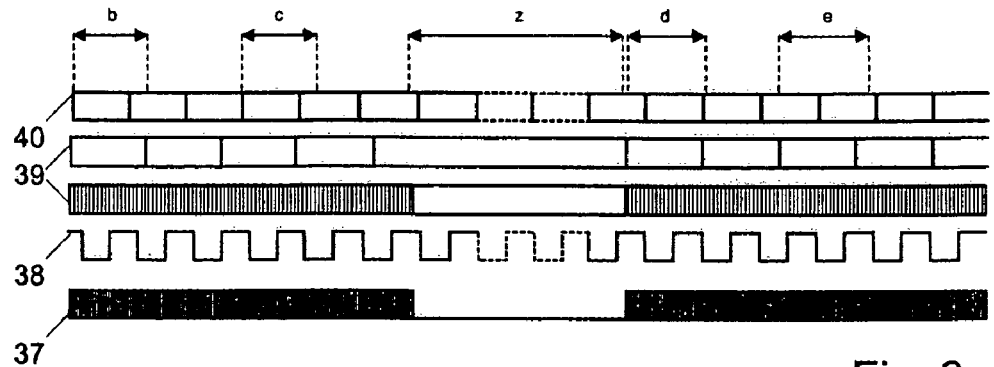
FIG. 3a shows a time diagram of the timing signals of a radiolocalization device according to the invention.

FIG. 3a represents the main GPS clock signal 37, also referred as the reference clock 37, and the slower auxiliary time reference 38 which is counted in the auxiliary reference timer 40. Signal 39 is a reference timer derived from the main GPS clock 37 and used to measure the GPS time. This reference timer will typically comprise two components, an Epoch counter, which counts code periods and a cycle counter, which measures the offset into the code period, i.e. in absence of any drift or motion of the satellite or receiver the correlation peaks of the received satellite would always occur at the same code phase of the reference timer 39 subject to small variations caused by the stability and accuracy of the main GPS clock. In real operating conditions, the code phase of the correlation peaks varies according to the motion of the satellites relative to the receiver.

FIG. 3a represents the situation in which, after a having tracked the GPS signal for a certain time (sections b and c), and having obtained one or more positional fixes, the radiolocalization receiver is put in a low-power sleep state (section z), in which the main GPS clock 37 and the reference timer 39 are inactive. Upon wake-up (sections d and e), the GPS clock 38 and reference timer 39 have no relationship with their state prior to the sleep state and may even be reset on wake-up. The auxiliary time signal 38 and auxiliary reference timer 40, on the other hand are active for the whole time represented in FIG. 3a, spanning some time before and after the sleep period (z).

Figure 3B:
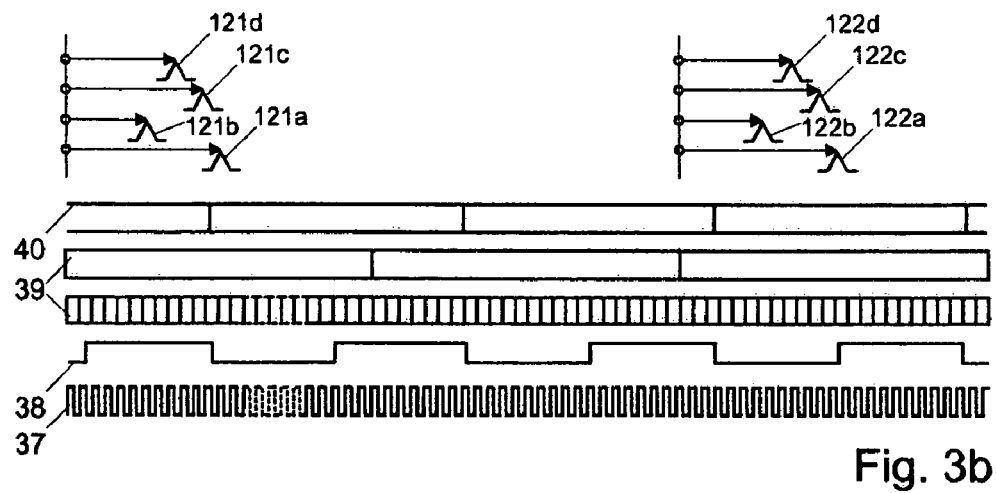
FIG. 3b represents a time diagram relative to a tracking phase of the radiolocalization device of the invention.

FIG. 3b refers to section (b) of FIG. 3a and represents, schematically, a tracking operation of the radiolocalization device. It is assumed here that the device has successfully acquired at least four satellites and identified the relative phase of the corresponding correlation peaks 121a to 121d. The pseudo-range engine will then track the peaks and provide valid data to the navigation engine which, in turn, issues search instruction 78 to the pseudo-range engine until the data to converge to a fix solution is achieved. Once the pseudo-range engine has detected the peaks of any satellite, the search instruction coming from the navigation engine for that satellite would be ignored, instead the pseudo-range engine would enter track mode for these autonomously.

In this situation the relation between reference timer 39 and GPS time is known to the system and the system is capable to predict the expected future position of the correlation peaks, 122a to 122d, from the actual values of relative speed of the satellites with respect to the receiver. At the same time, the system can also predict future Doppler shift and carrier frequencies for each acquired satellite.

Figure 3C:
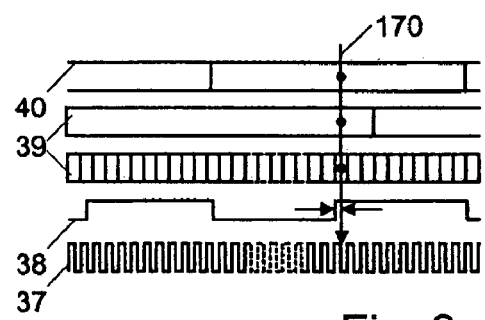
FIGS. 3c and 3d represent diagrammatically a sampling of an auxiliary time reference of the radiolocalization device of the invention.
Figure 3D:
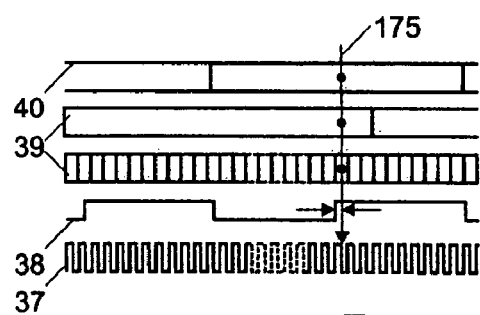

According to FIG. 3c, referring to section (c) of FIG. 3a, the radiolocalization device performs, while the main GPS clock 37 is active, a sampling of the auxiliary reference timer 40. In this operation the leading edge of the auxiliary time reference is sampled 170, and at that time the value of the auxiliary reference timer 40 is stored with the precision of the GPS clock 37, for example a 32.734 MHz reference clock, thus with a 30 ns uncertainty. The sampling 170 also includes the value of the reference timer 39. The values of the auxiliary reference timer 40 and of the reference timer 39 are taken at the same instant, or at different instant separated by a known time offset, for example a fixed time offset.

In the presented example the sampling 170 is done on the leading edge of the square auxiliary time signal 38. The system could however sample, in an equivalent way, other features of the auxiliary time signal 38, for example the trailing edge, in the case of a square signal, or in correspondence of any other defined feature of the auxiliary time signal 38, in the case of a signal of generic shape.

Preferably the system stores at least two spaced-apart samples of the auxiliary reference timer 40 and reference timer 39. In a simple realization, the system, while in the wake-up state, records periodically, every second or every few seconds a sample of the auxiliary reference timer 40 and of reference timer 39, and keeps the last two sample pairs recorded. Other schemes are however possible.

At section (d) of FIG. 3a the main GPS clock 37 and reference timer 39 are restarted after the sleep period (z). The phase of the main GPS clock 37 and the value of the reference timer 39 may have no relationship with their state prior to the interruption. At this point the correlators are unable to predict the position of the correlation peaks 122a to 122d. According to FIG. 3d, the system carries out a new sampling 175 of the auxiliary reference timer 40 and reference timer 39. Typically the sampling 175 is triggered by a periodic GPS synchronization event, for example every millisecond.

In a variant, the GPS system may be temporarily disabled during the sleep period (z), whilst the main GPS clock keeps running, for example because it is used elsewhere in the system. In this case the exact reference timer 39 loses the known relationship with GPS time.

The radiolocalization device of the invention can use the two samples pairs 170 of the auxiliary reference timer 40 and reference timer 39 taken prior to the interruption (z), in conjunction with the new measurement 175 to calculate what the reference timer 39 would have been if the GPS reference clock had run continuously and the GPS system remained enabled and therefore calculate the change on code phase of the correlators with respect to the last successful tracking of the correlation peak and the new reference timer state.

The value of the auxiliary time reference 40 and of the and reference timer 39 taken in the sample pairs prior and after the interruption (z) allow to re-calculate the relationship between the reference timer 39 and GPS time following the interruption of operation (z) of the reference timer 39.

When sampling the auxiliary reference timer 40 and reference timer 39 it is advantageous to sample the phase of the correlation peaks at approximately the same time, as this simplifies the extrapolation of their expected positions 123a-123d after restart.

According to the invention, the system could also sample other quantities, together with the auxiliary reference timer 40 and the reference timer 39, for example the carrier and code Doppler shifts can be sampled at the sampling points and subsequently used to predict likely carrier and code Doppler after the sleep period (z). In this way the searching the correlation peaks of the satellites after the sleep period (z) is further improved.

Figure 3E:
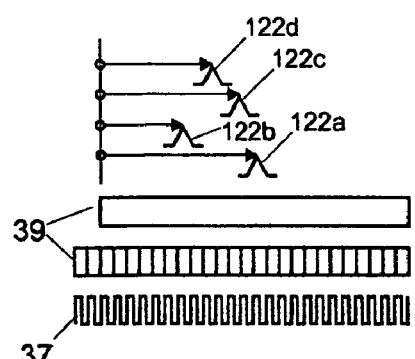
FIG. 3e represents a time diagram relative to a reacquisition phase of the radiolocalization device of the invention.

The radiolocalization device of the invention is able to estimate, as illustrated in FIG. 3e, for each satellite tracked before the sleep period (z) the most likely peak positions 123a to 123d and carrier and code Doppler frequency parameters based on the previous values when the satellite was last tracked prior to the sleep period (z), the rate at which they were changing and the measured samples of the auxiliary reference timer 40 and reference timer 39. The processor 26 can therefore immediately search for correlation peaks in windows around the predicted peak positions, with a high probability of rapidly detecting the satellites' signals.

Preferably the sampling 170, 175 of the auxiliary reference timer 40 and reference timer 39, and the subsequent estimation of the phase of the correlation peaks (123a-123d) are performed by the processor 26, internal to the pseudo-range engine 20.

Advantageously, the predicted peak position 123a-123d can be obtained by a simple linear extrapolation of their values prior to the interruption, assuming that their last known rates of change have been approximately constant during the period (z). In this way the pseudo-range engine will statistically be able to rapidly and autonomously reacquire many satellites prior to the navigation engine providing new search parameters and thus save significant power and time required when searching. Other arrangements are however possible, for example in which the estimation of positions of peaks 123a-123d is done in an external software module of the host system 90. In this case the prediction algorithm could be much more sophisticated.

To further improve the performance the host system 90 may predict the expected code phase and code and carrier Doppler shifts prior to the system entering a power saving mode. In this case, for example the host system may also take into consideration the user's current motion and other parameters to increase the probability of rapid detection.

When an uncompensated, low-power crystal oscillator is used, variations in the auxiliary time signal 38 and the corresponding error in the auxiliary time reference 40 will be dominated by temperature drift. However the temperature gradient is usually quite low inside an operational GPS circuit following the initial power on period. It is therefore feasible to ignore the change in temperature over short periods of time and still maintain adequate resolution to the predicted correlation windows 123a to 123d.

If needed, the auxiliary time reference clock may be automatically corrected for offset and drift, on the base of the accurate GPS time. This may be useful, for example, if the auxiliary reference signal is shared by other devices, for example in a PC.

Also Doppler shift and rate of change of the correlation windows 123a to 123d will derive mostly, for typical applications, to the motion of the satellite. Again the regularity of the orbit ensures that the satellite's relative speed is not likely to change radically over a period of some minutes. Therefore when the correlators are restarted there is a high probability that an adequate number of satellites will be rapidly reacquired.

As an example, assume that the system samples the auxiliary reference timer 40 and the reference timer 39 every five seconds while tracking, with a time uncertainty of 30 ns. The five-second interval is then known with an error of 30+30 ns=60 ns.

Assume now that the GPS clock and correlators are switched off for five minutes, and then wake up to calculate another fix. Another sample pair with an error of 30 ns is taken of the auxiliary reference timer 40 and the reference timer 39 and the correlation windows 123a to 123d are recalculated by a linear extrapolation based on the measured elapsed time. Ignoring the frequency drift of the auxiliary time reference itself the error is then 60×60 ns=3.6 μs.

Thus, given a correlation windows of ±15 microseconds the phase of the correlation peak can be predicted with sufficient accuracy to almost guarantee that correlators 25 will detect the satellite prior to the instructions of the navigation engine. In this case an intermittent operation with duty cycles of the order of 1-2% can be achieved, which represents a valuable power saving in pedestrian tracking.

Additionally, once the signals of the GPS satellites are reacquired and a fix available, the relationship between the reference timer 39 and GPS time is restored. The system can obtain the error between the predicted peak positions 123a-123d, and the actual phase offsets of the correlation peaks, this can be used to further correct the calculation of the relative frequencies of the two oscillators and improve the precision of the estimation over longer periods of intermittent operation.

The signal processor 20 could undergo repeated periods of power-saving mode or sleep periods (z), for example according to a periodic on-off cycle, or otherwise. In such cases the method of the invention can be repeated, as discussed above, after each period of power-saving mode, by using the a pair of samples of the auxiliary reference timer 40 and reference timer 39 taken prior to the period of power-saving mode, and a pair of samples of the auxiliary reference timer 40 and reference timer 39 taken after the period of power-saving mode.

The invention claimed is:

1. A signal processor for a radiolocalization receiver, wherein
said signal processor is adapted for processing received signals emitted by one or more radiolocalization satellites and modulated by predetermined ranging code sequences, the signal processor also being adapted for receiving a main clock signal, generated by a main clock, the signal processor comprising:
acquisition and tracking means for searching the input signal for the presence of the ranging code sequences in the received signals and for determining the relative phases of these ranging code sequences; and
computing means arranged to predict likely values of the phases of the ranging code sequences after an interruption of the main clock signal on the basis of an auxiliary time reference signal generated by an auxiliary clock available to the receiver.

2. The signal processor of claim 1, further comprising one or more code generators arranged for generating local code sequences related to the ranging code sequences of the signals emitted by the radiolocalization satellites, one
correlation engine arranged to phase-shift and compare the local code sequences with the ranging code sequences modulated in the received signal and provide correlation values between the phase-shifted local code sequences and the received signal.

3. The signal processor of claim 1, wherein the acquisition and tracking means are arranged for performing an FFT-transformation of the received signals and for determining the relative phases of the ranging code sequences by acting on the FFT-transform of the received signals.

4. The signal processor of claim 1, arranged for providing correlation peaks indicative of the relative phases of the ranging code sequences.

5. The signal processor of claim 1, further comprising one or more code generators arranged for generating local code sequences related to the ranging code sequences of the signals emitted by the radiolocalization satellites, one correlation engine arranged to phase-shift and compare the local code sequences with the ranging code sequences modulated in the received signal and provide correlation values between the phase-shifted local code sequences, wherein the acquisition and tracking means are further arranged for performing an FFT-transformation of the received signals, and wherein the signal processor is arranged for determining the relative phases of the ranging code sequences either from the correlation values provided by the correlators or by acting on the FFT-transform of the received signal.

6. The signal processor claim 5, further comprising an auxiliary reference timer derived from the auxiliary time signal, wherein the computing means are arranged to sample the time of the auxiliary reference timer, and of a reference timer derived from the main clock signal and to determine the likely phases of the pseudorandom code sequences after a sleep period on the base of any of the recorded sampled values.

7. The signal processor of claim 6, wherein the computing means are programmed to sample the auxiliary reference timer in correspondence with a defined feature of the auxiliary time reference signal and to sample the reference timer, the auxiliary reference timer and the reference timer being sampled simultaneously or at two instants separated by a known time delay.

8. The signal processor of claim 6, in which the computing means are programmed to periodically sample the auxiliary reference timer and the reference timer.

9. The signal processor of claim 6, in which the computing means are programmed to record at least two spaced-apart samples of the auxiliary reference timer and of the reference timer.

10. The signal processor of claim 1, wherein the computing means are arranged to calculate a relationship between the reference timer and GPS Time when a position fix is established.

11. The signal processor of claim 10, wherein the computing means are arranged to measure the auxiliary reference timer according to the relationship between the reference timer and GPS time.

12. The signal processor of claim 11, wherein the computing means are arranged re-calculate the relationship between the reference timer and GPS time following an interruption of operation of the reference timer based on the value of the auxiliary reference timer.

13. The signal processor of claim 1, wherein the computing means are arranged for providing correlation peaks indicative of the relative phases of the ranging code sequences and for determining the position of the correlation peaks after an interruption of the main clock signal or the reference timer on the base of the recorded pulse times and the recorded correlation peaks times prior to the interruption of the main clock signal.

14. The signal processor of claim 13, wherein the computing means also determine the position of the correlation peaks after an interruption of the main clock signal or the reference timer on the basis of the rate of change of the correlation peaks prior to the interruption of the main clock signal, or the reference timer.

15. The signal processor of claim 14, comprising one or more code generators arranged for generating local code sequences related to the ranging code sequences of the signals emitted by the radiolocalization satellites, one correlation engine arranged to phase-shift and compare the local code sequences with the ranging code sequences modulated in the received signal and provide correlation values between the phase-shifted local code sequences and the received signal, wherein the code generators generate local code sequences at controllable output rates, the output rates being constantly adapted to account for a Doppler shift in the received signals, wherein the computing means determine the output rates after an interruption of the main clock signal on the base of the recorded pulse times.

16. The signal processor of claim 1, connectable to a host system which provides the auxiliary time reference signal.

17. The signal processor of the claim 1, realized as a single integrated circuit.

18. The signal processor of claim 1, having a low-power state in which the correlation engine and/or the processor and/or the main clock can be temporarily switched off or put in a reduced functionality state to limit power consumption.

19. A Satellite radiolocalization receiver containing a signal processor according to claim 1.

20. The satellite radiolocalization receiver of claim 19, connectable to a host computer system, a PC, a cellular phone, and/or a PDA.

21. The satellite radiolocalization receiver of claim 19, comprising a radiofrequency module, computing means for running navigation software and peripherals for interaction with a user.

22. The satellite radiolocalization receiver of claim 19, wherein the main clock is periodically stopped and/or the signal processor is periodically put into a low-power state to limit power consumption.

23. The satellite radiolocalization receiver of claim 19, wherein the correlators and/or the processor and/or the main clock are switched off or put in a reduced functionality in the low-power state.

24. A signal processor for a radiolocalization receiver, wherein
said signal processor is adapted for processing received signals emitted by one or more radiolocalization satellites and modulated by predetermined ranging code sequences,
the signal processor also being adapted for receiving a main clock signal generated by a main clock, the signal processor comprising:
acquisition and tracking means for searching the input signal for the presence of ranging code sequences in the received signals, and for determining the relative phases of these ranging code sequences, wherein the signal processor is adapted to have a low-power state in which the correlation engine and/or the processor and/or the main clock are temporarily switched off or put in a reduced functionality state to limit power consumption; and
computing means arranged to predict likely values of the phases of the ranging code sequences after a period in the low-power state on the basis of an auxiliary time reference signal generated by an auxiliary clock and provided to the receiver.

25. A signal processor for a radiolocalization receiver, wherein
said signal processor being adapted for processing signals emitted by one or more radiolocalization satellites and modulated by predetermined ranging code sequences, the signal processor also being adapted for receiving a main clock signal generated by a main clock, the signal processor comprising:
acquisition and tracking means for searching the input signal for the presence of the ranging code sequences in the received signals and for determining the relative phases of these ranging code sequences; and
computing means arranged to predict likely values of the phases of the ranging code sequences after an interruption of the main clock signal on the basis of an auxiliary time reference signal generated by an auxiliary clock and provided to the receiver;
one or more code generators arranged for generating local code sequences related to the ranging code sequences of the signals emitted by the radiolocalization satellites; and
at least one correlation engine arranged to phase-shift and compare the local code sequences with the ranging code sequences modulated in the received signal and provide correlation values between the phase-shifted local code sequences, wherein
the acquisition and tracking means are further arranged for performing an FFT-transformation of the received signals, and wherein
the signal processor is adapted for determining the relative phases of the ranging code sequences either from the correlation values provided by the correlators or by acting on the FFT-transform of the received signal.

26. A signal processor for a radiolocalization receiver, wherein
said signal processor being adapted for processing signals emitted by one or more radiolocalization satellites and modulated by predetermined ranging code sequences, the signal processor also being adapted for receiving a main clock signal generated by a main clock, the signal processor comprising:
acquisition and tracking means for searching the input signal for the presence of the ranging code sequences in the received signals and for determining the relative phases of these ranging code sequences; and
computing means arranged to determine the likely values of the phases of the ranging code sequences after an interruption of the main clock signal on the basis of an auxiliary time reference signal generated by an auxiliary clock and provided to the receiver, wherein
the computing means are arranged for providing correlation peaks indicative of the relative phases of the ranging code sequences and for predicting the position of the correlation peaks after an interruption of the main clock signal or the reference timer on the base of the recorded pulse times and the recorded correlation peaks times prior to the interruption of the main clock signal, and wherein
the computing means also predict the position of the correlation peaks after an interruption of the main clock signal or the reference timer on the basis of the rate of change of the correlation peaks prior to the interruption of the main clock signal, or the reference timer;
said signal processor further comprising:
one or more code generators arranged for generating local code sequences related to the ranging code sequences of the signals emitted by the radiolocalization satellites; and
at least one correlation engine arranged to phase-shift and compare the local code sequences with the ranging code sequences modulated in the received signal and provide correlation values between the phase-shifted local code sequences and the received signal, wherein
the code generators generate local code sequences at controllable output rates, the output rates being constantly adapted to account for a Doppler shift in the received signals, and wherein
the computing means determine the output rates after an interruption of the main clock signal on the base of the recorded pulse times.

* * * * *